H. DEGENER.
LINE SETTING AND CASTING MACHINE.
APPLICATION FILED MAY 20, 1908.

913,627.

Patented Feb. 23, 1909.
10 SHEETS—SHEET 1.

Witnesses:

Inventor:

H. DEGENER.
LINE SETTING AND CASTING MACHINE.
APPLICATION FILED MAY 20, 1908.

913,627.

Patented Feb. 23, 1909.
10 SHEETS—SHEET 2.

Witnesses:

Inventor:

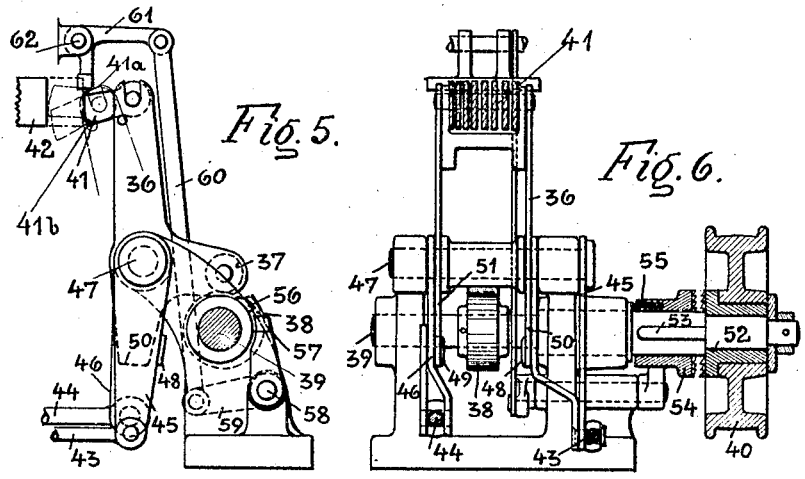
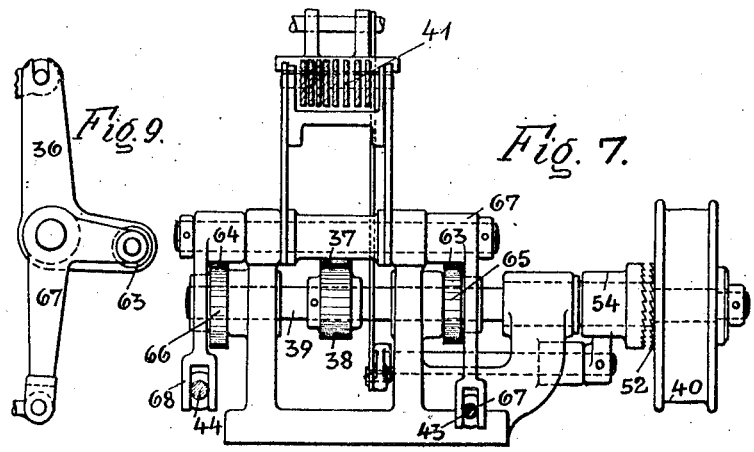
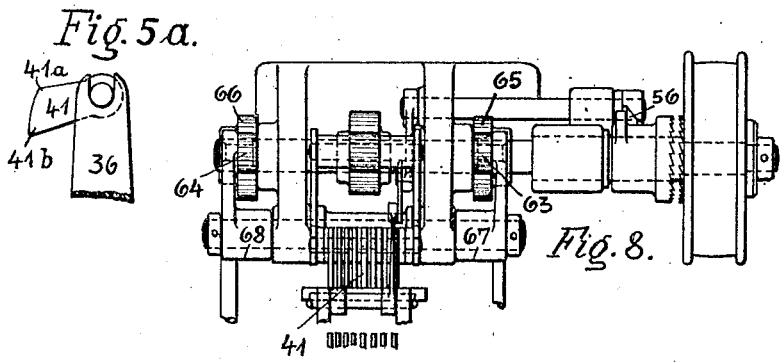

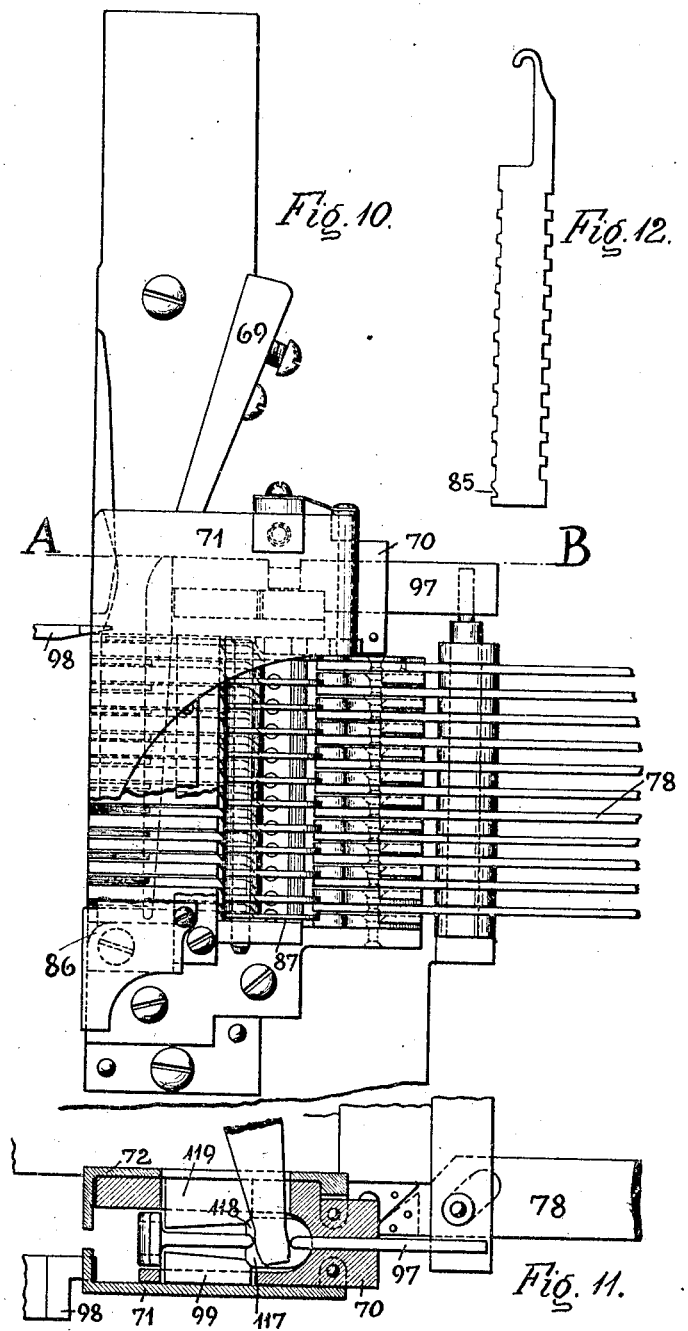

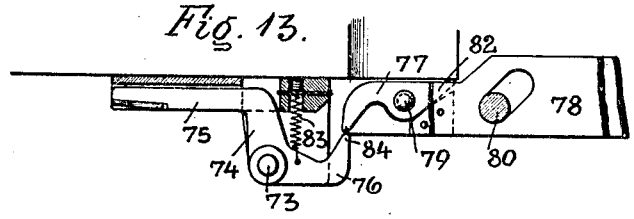
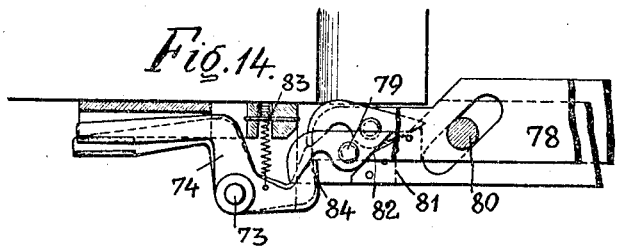
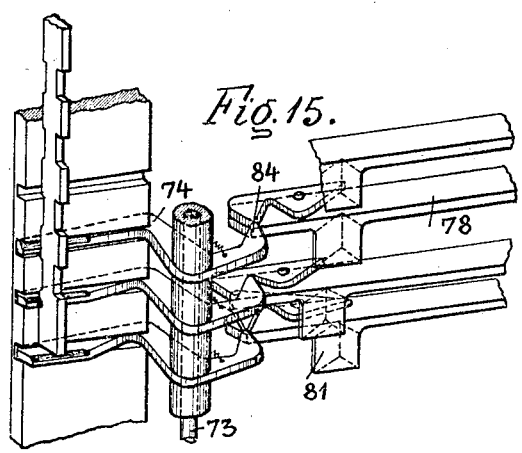

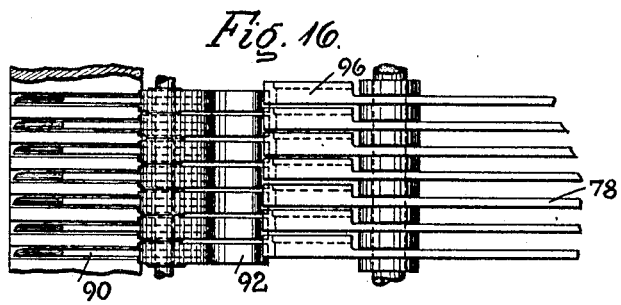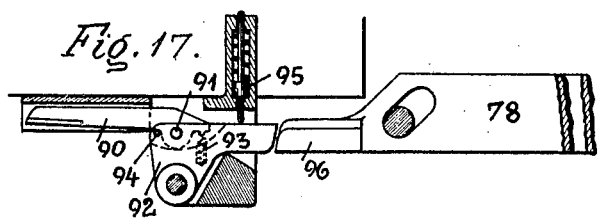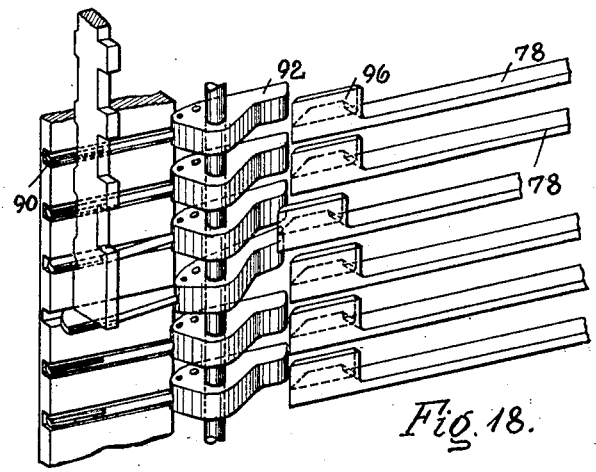

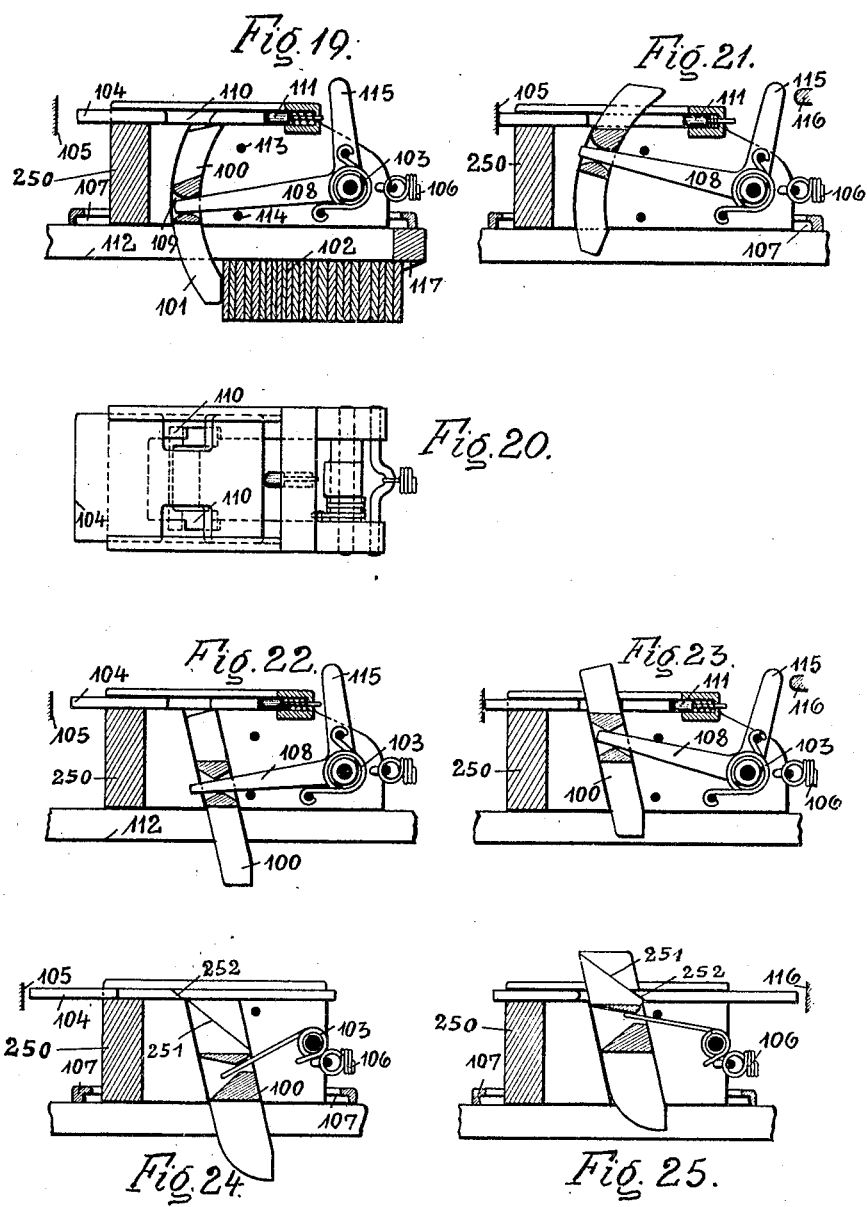

H. DEGENER.
LINE SETTING AND CASTING MACHINE.
APPLICATION FILED MAY 20, 1908.
913,627.
Patented Feb. 23, 1909.
10 SHEETS—SHEET 8.
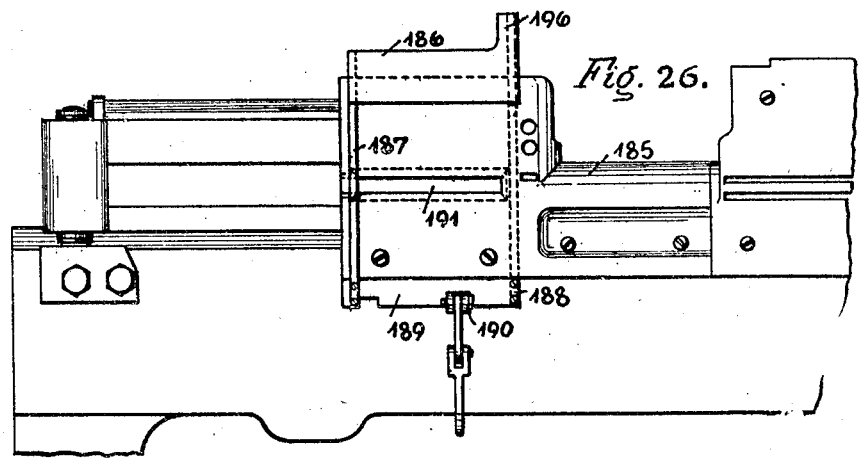
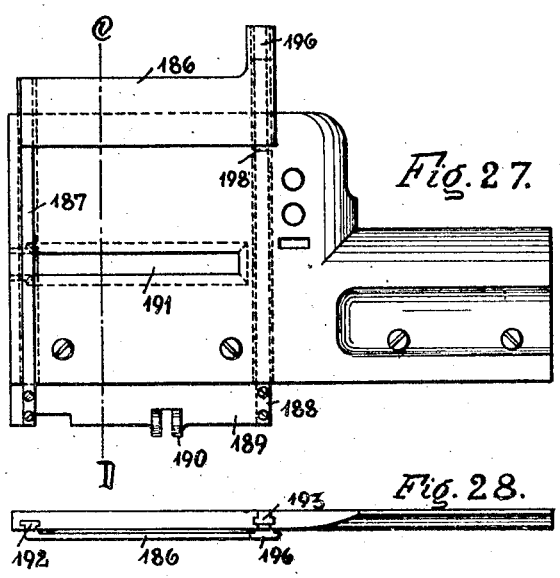
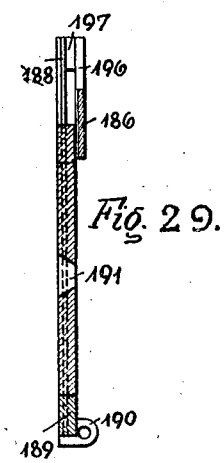
Witnesses:
Inventor:

H. DEGENER.
LINE SETTING AND CASTING MACHINE.
APPLICATION FILED MAY 20, 1908.

913,627.

Patented Feb. 23, 1909.
10 SHEETS—SHEET 9.

Witnesses:

Inventor:

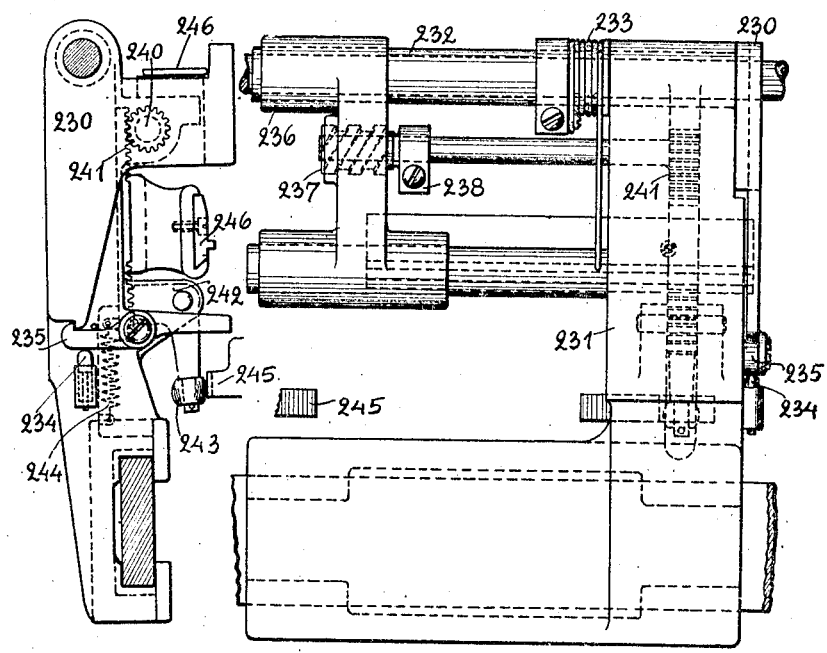
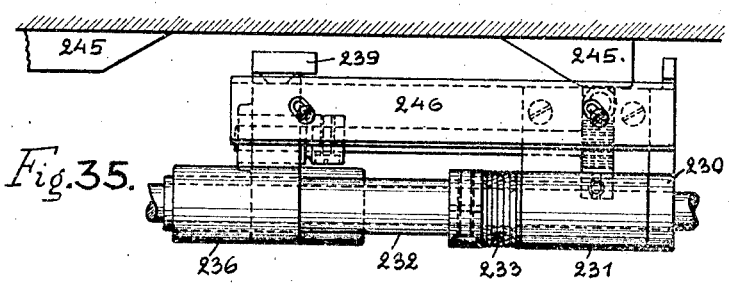

UNITED STATES PATENT OFFICE.

HEINRICH DEGENER, OF BERLIN, GERMANY.

LINE SETTING AND CASTING MACHINE.

No. 913,627. Specification of Letters Patent. Patented Feb. 23, 1909.

Application filed May 20, 1908. Serial No. 433,954.

*To all whom it may concern:*

Be it known that I, HEINRICH DEGENER, of 26 Hollmannstrasse, Berlin, German Empire, manager, having invented certain new and useful Improvements in or Relating to Line Setting and Casting Machines, do hereby declare that the following is an exact specification of the same.

My invention relates to improvements in line-setting and casting machines known under the name of "Monoline machines" in which matrices are used which display several superposed characters.

The object of the improvements is to increase the output of the machine as well as the strength and durability of the same and also of the matrices used therein.

The working of a setting machine provided with the improvements according to this invention is very much the same as the working of hitherto known machines of this kind. The matrix bars stored in the magazine are set into a line by means of a releasing and receiving mechanism operated from the keyboard, then carried to the place of casting, adjusted and justified, whereupon the matrix line is cast. While the line cast is trimmed and placed on a line galley next to others already finished, the matrix line moves into a position where it is loosened, and whereupon the single matrix bars are again brought back into their corresponding magazine compartments or chambers by means of a distributing device. In the machine according to this invention, there are important improvements in most parts as compared to known machines.

In the accompanying drawings the different points of invention are separately illustrated, the same reference signs being used as in the specification.

Figure 1:
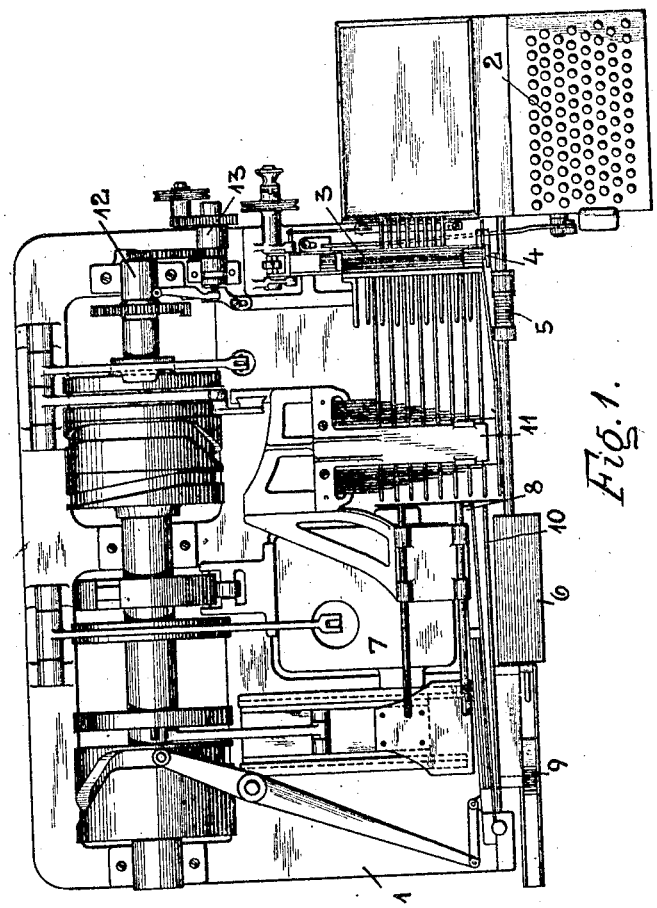
Figure 2:
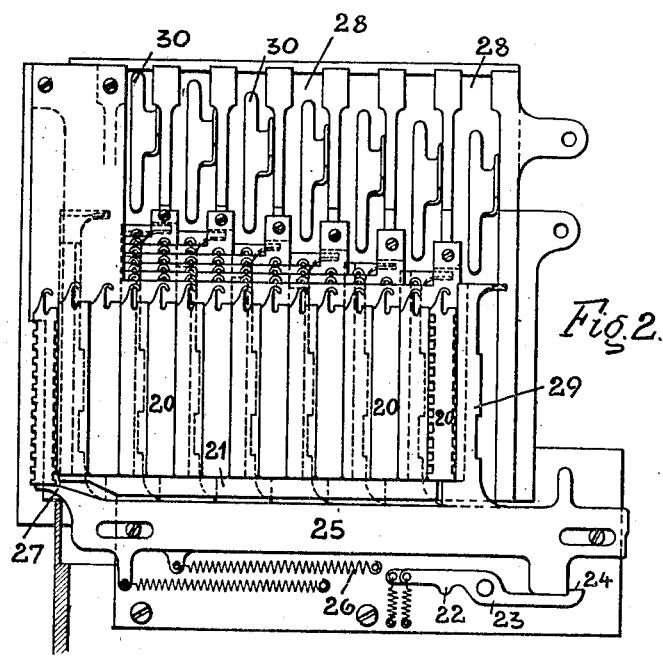
Figure 3:
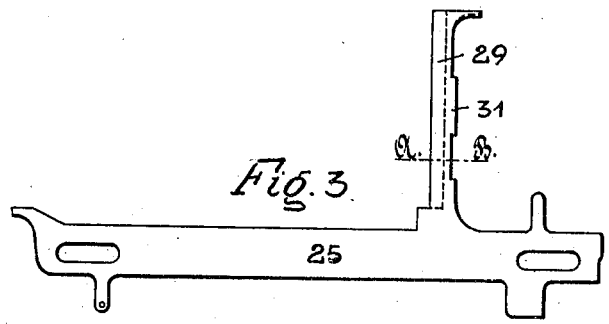
Figure 4:
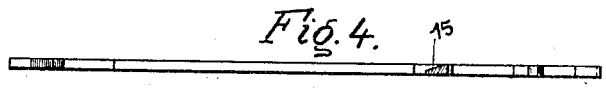
Figure 30:
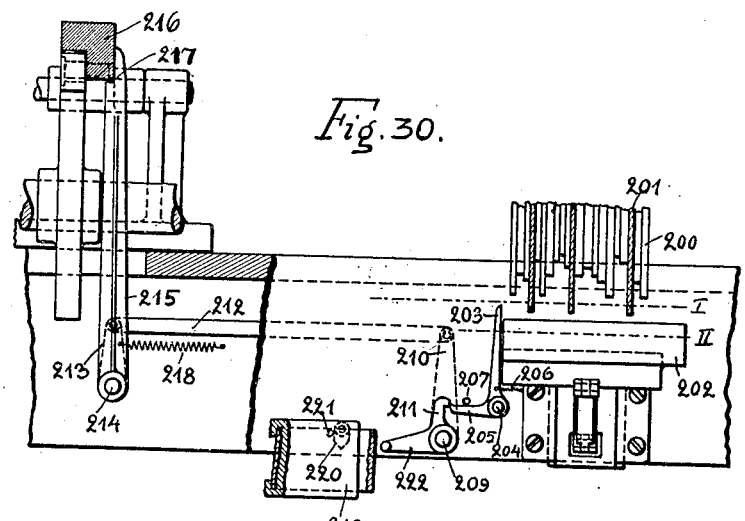
Figure 31:
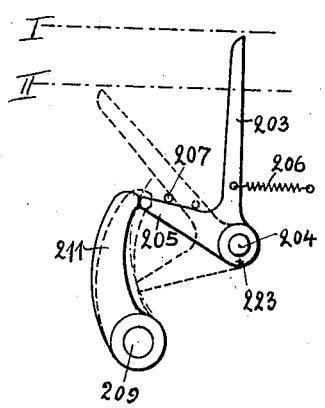
Figure 32:
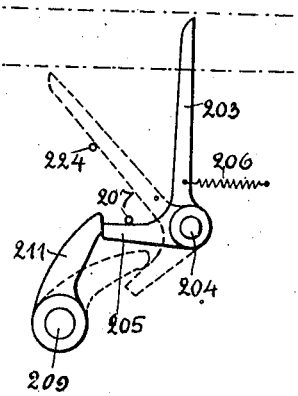

Figure 1 is a plan of the whole machine. Figs. 2 to 4 show the improved matrix magazine, Fig. 2 being a side elevation seen from the right hand side, the front covering wall being left out; Fig 3 showing a matrix slide in side elevation, and Fig. 4 showing the same in bottom view, the finger being cut on the line A—B of Fig. 3; Figs. 5 to 9 show the oscillator mechanism used in the machine, namely Figs. 5 and 6 one form of construction in elevation from the right hand side and from the front respectively, the latter view partly in section; Figs. 7 to 9 a second construction respectively in front elevation, plan, and a view seen from the right hand side of the driving or operating levers. Figs. 10 to 18 illustrate the collector mechanism; Fig. 10 being a front elevation, Fig. 11 a horizontal section on line A—B of Fig. 10, Fig. 12 a side elevation of a matrix with a separate groove for the locking pawl; Figs. 13 to 15 illustrate the working of the pawls, Fig. 13 showing the pawls in withdrawn and Fig. 14 in advanced position, Fig. 15 being a perspective view, Figs. 16 to 18 show a modified construction of the pawls respectively in front elevation, plan and perspective. Figs. 19 to 25 show three constructions of the collector carriage holding fast the collected matrices; Fig. 19 being a horizontal section. Fig. 20 a back view of the one construction of the collector carriage, while the Fig. 21 shows the same carriage in released and sliding-back position. Figs. 22 and 23 show in horizontal section a second construction respectively in locked and released position, Figs. 24 and 25 are corresponding sections of a third construction. Figs. 26 to 29 show the large front plate of the machine; Fig. 26 showing its mounting in the machine in front elevation with the casting block left out. Fig. 27 showing the front plate on an enlarged scale with the withdrawing slide in front elevation. Fig. 28 in plan and Fig. 29 in section on line C—D of Fig. 27. Figs. 30 to 32 illustrate devices for preventing insufficiently justified lines from being cast; Fig. 30 showing the machine in front elevation with the safety device added, and Figs. 31 and 32 showing modified constructions for locking the same. Figs. 33 to 35 represent the line-carriage; Fig. 33 being the front view, Fig. 34 the side view and Fig. 35 the plan view of same.

In the plan of the machine, Fig. 1, the table of the machine is marked 1, the keyboard 2, the magazine in which different kinds of matrices and space-blocks are stored 3, the collector for receiving the matrices and arranging them side by side 4, the line carriage 5 carries them to the casting block 6, and the casting pot 7 from which the molten metal is poured out into the casting mold 8. The line galley marked 9 is used for arranging the finished cast lines side by side; 10 is the withdrawing slide used for loosening the lines; 11 is the distributing device of the machine by means of which the matrices are again conveyed into the magazine; 12 is the main spindle of the machine with the cams mounted on the same and 13 is a counter-shaft with toothed wheels and coupling.

The magazine or case (Fig. 2) consists of several cross - channels, 28, in which the matrices are accumulated to be carried to the longitudinal canals. The width of the same corresponds to the thickness of the matrices. In the longitudinal canals of which, in the drawing, the front one is visible owing to the wall being omitted, the matrices are standing on foot-boards 21. Beneath the foot boards 21 each of the canals possesses a slide 25 with the extension 27 on which the front matrix is standing. At each release of a matrix, a device, not visible in the drawing, presses against the projection 22 of that of the locking levers 23 which belongs to the corresponding slide, whereby the finger 24 releases the slide 25 which is then withdrawn backwards by the springs 26. In this way, the front matrix which is standing on the extension 27 of the slide, can freely fall downwards in order to be further used for the purposes of the machine, and on the other hand a new matrix can slide from the cross-canal 28 corresponding to the kind of matrix in question, into the longitudinal canal where it arrives in front of the finger 29 of the retracted slide 25. The slide is then brought back into its original position in the well known manner, its finger 29 pushing in front of it the whole series of matrices and advancing each matrix to the extent of one place.

In order to enable the slide-fingers 29 to be made as thick as possible, and on the other hand to prevent the slides from simultaneously pushing several matrices sliding outside by side from the canal, the following device according to this invention is used. The matrices which are accumulated, as said before, in the various cross-channels 28, are suspended on slide-bars 30, on which they slide down in the longitudinal canals. Each of these slide-bars 30 come so far towards the front wall of the corresponding longitudinal canal of the magazine that each time only one matrix can fall down from the said bar 30 on the foot-board 21, and the slides 25, as well as the fingers 29 are made of thick material, the latter, however, as shown in Figs. 3 and 4 being chamfered 15, so that its front edge is narrower than that of the matrix, which it has to advance. When a slide advances, it pushes with its front edge only the first matrix in the canal 20 and pushes it forward, while other matrices still suspended on the slide bar 30, are pushed back by the chamfered edge of the finger 29. Owing to this arrangement, not only the slides themselves are rendered stronger than hitherto, so that it can no longer bend or break, but an entirely new result is obtained, that the matrices on the slide-bars are each time pushed by the chamfered slide fingers, and, owing to their movement, a reliable sliding-down of the matrices onto the bars 30 is insured. In this way, the shaking device hitherto used for constantly pushing the matrices, becomes superfluous. Another peculiar feature of the new slides consists in the arrangement on the fingers of projections 31 which, during the advance of the slides, cover the cross-canals 28 to such an extent that the next matrices cannot slide through behind the fingers and thus lead to interference with correct action.

*The Oscillator.*—The oscillator is the oscillating mechanism which is coupled at times to a continuously rotating driving spindle by means of the matrix-slides 25, of which each time one springs back and releases one matrix, and during its oscillation forward, following such coupling, it brings back the released matrix-slide. This is actuated by means of a system of pawls 41 which are as much in number as the matrix-slides 25. As shown in Figs. 6 and 7 eight pawls are provided corresponding to the eight matrix-slides and the eight sorts of matrices generally used in the Monoline-machine. The rear ends of the matrix-slides 25 are shown in Fig. 5, signed with the reference-numeral 42. One of these matrix - slide - ends 42 comes, at each release of a matrix, in touch with one of the pawls 41, and the latter pushes it back to its normal position. It is, however, not sufficient to remove the matrix-slides 25 into their normal position. For each slide there is a locking lever 23 (Fig. 2) retaining it, kept in normal position by a spring and thrown out by a lever moved from the key-board and pressing against the projection 22 of the lever 23, the pawl 41 is to be pushed forward a little beyond the point where the attaching-hook of the lever 23 and the slide are locked under the tension of the mentioned spring. Therefore it is to be prevented that all the pawls 41 get into engagement with their respective matrix-slides, for otherwise a severe shock would take place by which some parts of the oscillator mechanism might be destroyed. Therefore the pawls 41 of the Figs. 5–9 are formed as eccentrics in such a manner that the upper corner 41$^a$ has smaller distance from the pivot center of 41 than the lower corner 41$^b$. This device acts as described in the following: The matrix-slide 25 being pulled back by means of the spring 26 (Fig. 2) comes with its rear end 42 into engagement with its respective pawl 41 shown in Fig. 5 in full-line position. The oscillator now is rocked forward and the eccentric pawl 41 pushes the matrix-slide into a state of rest. During this movement the eccentric 41 moves on its pivot and rolls on the rear edge of the slide, this slide being forced in consequence of the specially curved form of the pawl 41 to push forward with a greater speed than the pivot of the pawl 41 pushing thus the slide into its utmost left position as is shown in dotted lines in Fig. 5 while the other pawls 41 are prevented to coöperate with their respective slides, because they assume by gravity such an utmost left position that they rest on their resting rod and the distance 41$^a$ from pivot being shorter than 41$^b$ from pivot, they remain out of contact with their slides.

During the tilting motion of the oscillator, this mechanism performs three separate functions: It brings back the matrix-slide, drives the collector pusher and operates the stop-bar returnfork. Each of these three movements executed by the oscillator must take place at a given point of its oscillating path. For this purpose, as shown in the Figs. 5 and 6, in the swinging oscillator-frame 36 is mounted a roller 37 which is moved by the cam-disk 38 so soon as the spindle 39 supporting the said cam-disk is coupled to the continuously rotating pulley 40. When such a movement takes place, the oscillator frame 36 swinging forward, pushes by means of the eccentrics 41 supported by it, the matrix-slides which had sprung back into their original position, and then the oscillator is brought back to the position of rest shown in Fig. 5, by means of a spring not shown in the drawing. The link 43 serves to return the stop-bars and is secured to the stop-bar-withdrawing-fork which is not shown in the drawing. The link 44 serves to move the collector-pusher. These two links are respectively connected to separate oscillating levers 45 and 46, which are both rotatably mounted on a spindle 47. Each oscillating lever 45 and 46 is provided on the inside with a stop respectively indicated by 48 and 49, and the oscillator-frame carries two downward extensions 50 and 51 which, in the position of rest, are removed from the said stops 48 and 49 to a certain extent. When the oscillator frame swings forward, its extensions 50 and 51 come, at a point to be exactly determined, in contact with the stops of the two oscillating levers, and thus drive the two links 43 and 44 in the manner required for the working of the setting mechanism. The return of the two bars is effected by means of springs not shown in the drawing. The coupling of this new oscillator, as will be seen from Figs. 5 and 6, is operated in the following manner.

The loose pulley 40 continuously rotating on the spindle 39, is secured to a hub 52 provided with lateral teeth, and formed as a coupling disk. To the spindle 39 is connected, by means of a groove and feather 53, a disk 54 corresponding to the above mentioned coupling disk 52 and tending to be pressed by means of springs 55 against the other coupling half 52; the disk 54 is provided with a cam projection 56 against which, in the position of rest as shown in Fig. 5, abuts a finger 57 provided with a cam-face in such manner that the two coupling disks are held separated from each other. The finger or cam 57 can be brought out of engagement with the cam projection 56 of the coupling disk 54 by means of a lever 59 connected to its pivot pin 58, connecting rod 60 and anchor or armature 61. This takes place when a matrix-slide released by means of the keyboard, springs back and rotates the anchor 61 about its spindle or pin 62. Under the action of the springs 55, the disk 54 is pushed towards the right on the feather 53, becomes coupled to the rotating disk 52, and the spindle 39 is rotated, whereby the roller secured to the oscillator frame is raised by the cam disk 38 and the oscillator turned forward. In this movement it pushes the matrix-slide which had been retracted into its position of rest, and the anchor 61, the rods 59, 60 and the cam 57 fall back again into their position of rest by gravity or under the action of a separate spring, and the cam-face of the coupling half 54 again comes into engagement with the corresponding cam-face of the finger 57, whereby the disk 54 is brought out of engagement with the teeth of the disk 52.

The construction of oscillator shown in Figs. 7, 8 and 9, is provided with the same coupling, but the driving of the return fork for the stop-bars and of the collector-pusher is not affected in this construction by the swinging oscillator frame by means of separate stops, as was the case in the preceding construction. In this construction the matrix-slides are also forced back by means of the swinging oscillator-frame 36, and the said oscillator frame is caused to move by means of a roller 37 and cam-disk 38, but each of the two connecting rods 43 and 44 operating the collector-pusher and the return fork for the stop-bars, is provided with a separate lever 67 and 68 respectively, each of which carries a separate roller 63 and 64 which are moved respectively by cam-disks 65 and 66 of the spindle 39. Fig. 9 shows the lever 67 used for withdrawing the stop-bars and the oscillating frame, seen from the right hand side. It follows therefrom that it is easily possible, by arranging in any desired manner three independent cam-disks 38, 65 and 66, to effect the movement of the matrix-slides, of the collector-pusher and of the returning fork in the manner which appears suitable for each of the same.

The present invention relates to a collector in which the single rulers, bars, pawls or the like forming the bottom of the collector may be used when required either as bottoms of the collector or as locking pawls. By this arrangement the above mentioned advantages have been attained without increasing the number of the moving parts.

In Figs. 10 and 11 the collector body which in the main consists of a plate fastened on the frame of the machine is marked 70 the front collector wing 71 and the back collector wing 72, the matrix sliding down bar 69, the collector pusher 97, all these parts working in exactly the same way as in known constructions. The matrices fall down from the magazine, the collector-body 70 itself at the back, the sliding down rail on the right hand side, and the wings 71 and 72 in front and on the left hand side, forming together a box acting as a guide. After the matrix has fallen down into the box onto a bottom formed in the manner hereinafter described it is pushed out by the pusher 97 from the collector on to the ruler or bar 98 shown in Figs. 10 and 11. The collector pusher is made of such height that it extends from the top to the fixed bottom 86 of the collector, so that the matrix to be advanced comes to rest against as large a surface as possible and cannot tilt backwards during the advance. The pusher is provided in well-known manner with projections or stops 117 and 118 which, during the advance, strike the blocks 99 and 119 of the wings 71 and 72 and open out the wings so that the road for the matrices is free. The bottom of the collector has the purpose to catch up the matrices falling down from the magazine, but the matrices having several different characters, must be caught in such a number of different heights as different characters on one matrix. Therefore besides the fixed bottom 86 of the collector the bottom may be formed in the following manner. On the bolt or pin 73 (Figs. 13–15) are rotatably mounted several double armed levers 74 the number of which depends on the characters on one matrix-bar, the said number in the construction illustrated being, for instance, 12. The shape of the said levers is shown in Figs. 13 and 14. One arm 75 of each lever is sharpened at the end like a knife, for being used as a pawl engaging with a groove at the matrix, as later described, and engages with the slots in the back wall of the collector body, and the other arm terminates in a hook-shaped projection 76, the point of which engages with the hook-shaped point of a second double armed lever 77, the latter being rotatably mounted on a pin 79 on a bar 78. These bars, as in the known constructions, are the slides which are intended to form the bottom of the collector; they are guided in front of the key board-box on pins 80 by means of oblique slots and advanced forwards to the left when the keys are struck, the bar advancing each time being the one corresponding to the height or level of that letter on the matrix-bar the key for which has been depressed. To the bottom side of the point of each bar is riveted a triangular block 81 which rests with its oblique face on the beveled arm 82 of the lever 77 in such manner that the block 81 of the higher bar comes to lie on the lever of the next lower bar. Springs 83 always hold the points of the two levers 74, 77 in engagement.

When the bars 78 are all in the position of rest (Fig. 13) all the lever arms 75 have retreated into the slots of the collector back wall, but if, by striking a key of the keyboard, a bar is advanced (Fig. 14) then the block 81 arranged on its bottom side is moved away from the cam face 82 of the next lower lever 77 and releases the same, so that, owing to the action of the spring 83, the two levers 74 and 77 are oscillated and the lever end 75 comes out from the back wall of the collector. In this way, a bottom is formed in the collector, on to which the matrix (Fig. 15) falls. Simultaneously, the lever 77 secured to the bar 78 is moved forwards to the left. Its arm 82 slides during that movement, on the cam-face of the block 81 of the next highest bar, in such manner that it cannot make any movement relatively to the advanced bar, but its point slides down from the point 84 of the lever 74 and releases the latter, so that it can rotate until the hook-shaped parts of the two levers again come into engagement. This takes place so that only the knife-like sharpened part of the arm 75 can come out from the back wall of the collector. If, therefore, one of the bars 78 is advanced, the two adjoining levers 74 are moved thereby, the bottom one to such an extent that it forms a bottom for the collector, and the upper one only to such an extent that it projects from the back wall of the collector like a spring pawl. The matrices (Figs. 12 and 15), in addition to the recesses for the type characters and the alining grooves may also be provided with the well known groove 85 which has, however, a shape slightly different from the known one. When the matrix is discharged into the collector, it engages with its foot with the lever 75 forming the bottom, while the next highest lever 75 operating as a locking pawl, engages with the groove 85 of the matrix and prevents it from springing up again. In place of the groove 85 one of the type grooves may be used, or, if the bottoms enter the collector from the other side, one of the back grooves. The shape of the groove may be any desired.

If it be desired to bring the matrix into its lowest position, it is discharged onto a fixed bottom 86 (Fig. 10) in the collector, while the last lever 87 acts as a pawl. The uppermost of the levers 74 acts only as a pawl, and therefore the driving lever 77 corresponding to it, can be rigidly secured to the upper bar. The lowest lever is arranged on the collector casing and is moved by the block 81 of the lowest bar.

A second construction in accordance with the present invention is shown in Figs. 16 to 18. In this case also, the pawls forming the bottom of the collector are at the same time utilized as locking pawls for the matrices, but, unlike in the first construction the whole system of levers for moving the said pawls is made separate and in the position of rest is not in any way connected with the bars 78, so that, when the keys are struck, the said system of levers is not affected by unintentional movements of the said bars produced thereby. The levers 90 which also form locking pawls, are rotatably mounted about pins 91 in levers 92 and are held by springs 93 (Fig. 17) in engagement with the stop pins 94. Spring-controlled pins 95 press the levers 90 into the slots of the collector back wall. The bars are provided with projections 96 which, on the advance of the bars, act on the ends of the levers 92 and press them back, so that the levers 90 thus come out from the slots. Each of the projections 96 always acts simultaneously on two superposed levers 92, but they are arranged in such manner that they move the upper lever only a little, so that the corresponding lever can come out only as a locking pawl, while the bottom lever is moved out to such an extent that it forms the bottom of the collector. As the levers 90 are mounted on the levers 92 by means of springs, they can act as locking pawls.

*Collector - carriage.*—For the improved monoline machine according to the present invention, the construction of collector-carriage illustrated in Figs. 19 to 25 may be used. The collector carriage is intended to hold fast the matrix-line while it is being formed, that is to say to prevent the matrices set in the collector and arranged in a row on the bar, from falling down until the line has been completely set, and thereupon to return to the original position, in order to be ready for the next line. The principle common to three improved systems of collector carriage hereinafter described is as follows: In a carriage, or slide block 250 moving in suitable horizontal guides 107 on the inner side of the perpendicular face or front plate 112, lying below the magazine, a sliding member 100 is positively guided, and projects with its front portion 101 through the slit of the said so called small front plate 112 of the machine which forms the continuation of the back wall of the collector. The matrices are pushed by the collector pusher 97 from the left hand side to the right hand side over the locking-pawl 117, which prevents the matrices from falling backward. Thereby the matrices are arranged in a row, and the flattened front end 101 of the sliding member 100 lies against the first matrix thereby holding the matrix-line. In the same measure as the matrix-line increases by adding matrices, the member 100 together with the collector-carriage yield to the left hand side, always pressed against the first matrix by means of the spring 106, the other end of which is fastened to the frame of the machine. If the line is ready the collector carriage must be released to deliver the matrices in the well known manner to the line carriage. For this purpose the back end of the member 100 rests, under the pressure of a spring 103, against a perforated or recessed plate 104. This plate is movably located in the slide block 250 and pressed by a spring-controlled piston 111 to the left. When the matrix-line is almost completed, the above mentioned recessed plate 104, striking a stop 105, moves in such a way that the positively guided slide springs into the recess 110 of the said sliding plate and thus releases the matrices, whereupon the spring 106 brings back to its original position, the collector-carriage sliding in grooves 107.

In Figs. 19 to 21 the sliding member 100 is guided in a curved path in the collector carriage, and a tappet lever 108 projecting into a recess 109 of the sliding member mediates to press the latter against the sliding plate 104. Fig. 21 shows the position in which the slide 100 is released. The slide springs so far behind the front surface of the small front plate 112, that during the return of the carriage into its original position, the point 101 of the slide does not come into contact with the face of the matrix. This is a great advantage over some old systems of collector-carriages in which, during the sliding back of the collector-carriage, the point of a holding finger slides over the type face of the matrix and wears it out to a great extent. The travel of the said tappet lever 108 is limited at top by the pin 113 and at bottom by the pin 114. Shortly before the collector-carriage has returned to its original position the upper arm 115 of the tappet lever 108 strikes a stop 116, whereby it is again forced to the left and drives the slide 100 forwards, so that the latter is again ready to hold fast the matrices pushed from the collector over the locking pawl 117.

Figs. 22 and 23 show a collector-carriage in which the sliding member 100 moves not in a curved but in a rectangular path, namely in an oblique direction away from the matrix line. Owing to this oblique arrangement, the sliding member does not slide on the last matrix when springing back, but is lifted off in a frictionless manner.

The device shown in Figs. 24 and 25 is similar to the last preceding one in so far as that the sliding member 100 is guided in a rectilinear manner. The same is also locked by a recessed slide-plate 104 and springs back under the action of a spring 103 after the sliding plate 104, on striking against the stop 105, has moved in the collector-carriage and the recesses 110 have moved beyond the slide. The collector carriage being no longer held by the matrices, moves thereupon under the action of the spring 106, as in the preceding constructions, back to its original position, but the slide 100 is advanced again in a different manner. The sliding member is provided with a special cam-face 251 with which the edge 252 of the sliding plate coöperates as soon as the latter, shortly before the carriage has returned to its original position, has struck the stop 116. This causes the sliding plate to move in the carriage to the left, and the edge 252 presses against the cam-face 251 of the slide and thus again advances it.

*Line-carriage.*—The present construction of a line carriage allows, that the space between the assembling mechanism and the key-board remains free from other mechanisms by making use of the locking wing 230 (see Figs. 33—35) attached to the right of the upper part of main carriage casting 231, and this part 231 projects as much as is necessary in order to place the guide-bar 246 between the main carriage body and the machine. The wing 230 moves to the same utmost right point as does the locking wing (H⁷) of the former systems of line-carriages. By this the space between the assembler and the key-board in front of the machine has not to be reserved for the carriage moving to its utmost right position and may be used for other mechanisms, specially for the assembling and detaining mechanisms as illustrated in Fig. 12.

The following is a description of the carriage: The wing 230 is attached to a sleeve 232 and swings vertically on the upper guide rod under the tension of the spring 233. The under part of the wing corresponds with a pawl 235, pushed upwards by means of a piston 234. The wing is released shortly before the line-carriage, returning from the distributing point on its way, has taken place in its utmost right position, whereby the wing having swung out to an angle of 45 degrees, may not collide with the assembled matrix-bars. When the carriage has reached the utmost right point of its way the wing is locked by means of a lever or handle similar to prior systems. The jaw 236 is moved, such as known, by turning the screw sleeve 237 that may be tightened on a corresponding guide rod by means of a slitted ring 238 so that a different length of line of bars may be assembled in the carriage. In order to render the carriage capable of taking charge of lines of many different lengths the jaw 239 is fitted to the part 236 by tongued and grooved joint, whereby the jaw may be readily removed from 236 and another jaw of a different length may be substituted. The screw shaft 237 is turned by the rack-gear 240—241, moved by the bent and indented lever 242. This lever bears on the end of its vertical leg a small pivoted ball sliding on a curved bar 245 united with the frame of the machine and is held to it under the tension of spring 244. This curved bar is higher at those points of the way of the carriage which require the carriage be unlocked and causes by its special profile the turning of the screw sleeve 237, the moving of the jaw 236—239 and an increase or decrease of the distance between this jaw and the wing 230 the effect being to loosen or to fasten the hold of the carriage on the line. The bar 246 attached to the carriage serves as a ledge or shoulder bearing the lower ends of the matrices after the line of type is released by the depressor.

*Large front plate.*—Before the single matrices are sorted back into their corresponding case compartments the matrix line cast, must be loosened and so prepared that the different lengths of matrix hooks become operative. This is effected by pulling out the wedge-portions of the space-bars between the side-parts thereby rendering them thinner so that the line which up to that time was firmly justified, becomes loose, and the matrices are brought with their bottom edges on the same level. This operation is effected by means of a withdrawing device consisting of a frame-shaped vertically adjustable slide 186 which, after the matrix-line has been cast and the casting mold together with the cast type line advanced, moves downwards and presses against the upper ends of the wedge-portion of the space-bars thereby pulling them out between its side parts and rendering the space-bars thinner. At the same time the slide 186 presses against the upper shoulder-like edges of the matrices and brings them downwards to one level. This withdrawing frame is moved by means of a separate auxiliary spindle, and is guided by means of two vertical slide bars 187, 188 in two T-shaped grooves 192, 193 arranged on the so-called "large front plate." This front plate forms the front guide for the matrix line going to the casting block. To prevent that the matrices during the passage along the large front-plate become worn out, on the front-plate according to the present invention only the left hand guide bar 187 has been left on the front face of the front plate, the right hand bar 188 being moved to the back. Figs. 26-29 illustrate such a large front plate 185. The upper part of the withdrawing device, the bottom edge of which is used for pulling out the space wedges and for depressing the matrices, is marked 186. The left hand guide ledge of the withdrawing device is marked 187, the right hand one 188, and the bottom portion of the same 189, is provided with an eye or lug 190, in which is pivoted a rod from an auxiliary spindle. The front plate is provided with a slot 191 through which the casting mold projects during the casting of the line, in order to press closely against the matrix line. The two T-shaped guide slots in the front plate are marked 192 and 193, and ledges 187 and 188 slide vertically in the same. As will be seen from the figures, the matrices brought in from the right hand side, slide in this construction over the smooth front side of the large front plate, and the groove 193 arranged on the back, does not affect the matrices. The left hand groove 192 does not matter as regards the wear, as the lines move towards the left only up to the slot 191. Owing to this construction, the upper portion 186 on the right hand side had to be made in the shape of a bridge, and is therefore, provided with a lug 196. The same is riveted or bolted to the guide ledge 188 with the insertion of a distance piece 197, and the front plate is provided with a slot 198 into which the distance piece 197 can enter if the withdrawing frame descends in its deepest position.

*Pump stopping device for insufficiently justified lines.*—In setting the matrix line between the single words space-bars are inserted which consist, as said before, each of a wedge portion movable between two spring like side parts. In driving in, or withdrawing the wedge portion, the space-bar is rendered thicker or thinner respectively. Fig. 30 shows a set line consisting of matrices 200 and space bars 201. The wedge portions of the space bars are driven in by the justifier shoe 202 moved from the main shaft of the machine in a manner not visible on the drawing. In the case of a loosely set matrix line, it may happen that the space wedges even when driven in very strongly, are not sufficient, for justifying the line so firmly that the matrices should lie close on each other. In such a case on casting the line, small particles of metal get into the intermediate spaces between each two matrices whereby a bur is formed which in printing causes "picks" and is liable to make the line unsuitable for printing. To obviate the above drawback, the machine according to the present invention is provided with a device which, when the line is incompletely justified, that is to say, when the spaces are driven in too far, renders impossible a movement of the pump plunger. The line I Fig. 30 indicates that position of the bottom edge of the spaces which they reach when the wedges are completely driven in or in too far. Line II indicates the level for completely withdrawn wedges.

During the setting, the pump plunger is stopped, a lever 215 recessed at the top engaging with its shoulder 217 under the pump lever 216 serving to operate the pump plunger. On the pivot pin 214 of the lever 215 a small lever 213 is keyed and a spring 218 has the tendency to move the lever 215 away from the pump plunger. The said movement is prevented from taking place by the lever 213 being connected by a rod 212 to a lever 210 pivoted at 209, a locking lever 211 being secured to the pivot pin of the latter lever. With the upper edge of the said locking lever engages one arm of a bell crank lever rotatable on a pin 204 and pressed by a small spring 206 against the stop 207. The spindle 209 and the pin 204 are carried on the machine frame. The upper end of the other arm 203 of the bell crank lever is about one-tenth of a millimeter below the line I, that is to say, one-tenth of a millimeter below that level which corresponds to the bottom edge of the completely driven in space wedges, the position of parts illustrated being the position of rest. If now an insufficiently justified line moves from the setting to the casting point, the bottom edge of the space wedges which have been driven in too far or high move above the upper point of the bell crank lever branch 203 towards the left and do not come into contact with the latter, so that the whole mechanism remains at rest, and no casting can take place. If, however, the line be sufficiently justified, then the space wedges project so low that upon the movement to the left, the first space wedges strikes the upper branch 203 of the bell crank lever, whereby the latter is turned to the left and the branch 205 releases the locking lever 211. In consequence of this, the spindle 209 and the lever 210 rotate, the rod 212, the levers 213 and 215 move under the influence of the action of the spring 218 towards the right and the lever 215 is disengaged from the pump lever, so that the latter can move and casting take place.

The return of the parts into the original position is brought about by the returning line carriage 219 provided with a pawl 220 which presses downwards the arm 222 connected to the locking lever 211 whereby the levers of the spindles 209 and 214 are moved to the left against the pull of the spring 218. At the same time, the spring 206 pulls the bell crank lever branch 205 upwards until the latter strikes the pin 207 whereby the edge of the branch 205 again locks the locking lever 211. The pawl 220 is rotatably mounted in the line carriage, in such manner that during the movement of the line carriage from the setting to the casting point, the said pawl slides over the end of the lever arm 222 without pressing it downwards. During the return of the carriage, however the said pawl engages with the pin 221 and is thus fixed and becomes operative.

Figs. 31 and 32 show two constructions of a pawl device by which the bell crank lever rotated by the space wedges, is locked in the outermost left hand position, so that it cannot spring back under the action of the spring 206 and come into contact with the next spaces of the same line. The construction of the locking lever 211 in Fig. 31, shows a peculiar curvature of the same, such that the center of curvature 223 is situated slightly below the fulcrum 204 of the bell crank lever. If now the bell crank lever is turned into the dotted position, the locking lever 211 moves under the action of the spring 218 (Fig. 30) to the right to the same extent, so that the point of lever arm 205 always remains in contact with the concave side of the lever 211. As the said curvature is situated eccentrically of the circular path described by the point of the lever arm 205, the bell crank lever will be braked in even position of the lever 205, whatever be the level of the bottom edges of the spaces between the upper end 203 and the line II during the release, so that the said bell crank lever will be locked in its left hand position. A similar action is obtained in the construction shown in Fig. 32, by shifting the fulcrum 209 of the locking lever 211 so far to the left that, when the lever 203 is turned to the left and the locking lever 211 released, the latter is caused by the spring 218 to fall to the right in such a manner that it presses on the upper edge of the lever arm 205 and prevents it from going back, a pin 224 limiting the movement of the arm 203. It is possible by simple constructive means to cause the lever 211 to make a sufficiently large movement when the safety device is disengaged, in spite of the small movement of the lever 215.

Having thus fully described the nature of my invention, what I desire to secure by Letters Patent of the United States is:

1. The combination with a matrix-bar magazine having separate chambers for each species of matrix and delivery-channels arranged substantially at right angles to each matrix-chamber, of matrix slides supporting the matrix-bars in the channels and each having a finger to push forward the matrices each finger coöperating with the thin sorts of matrices being thicker than these matrices and having a chamfered face substantially as described.

2. The combination with a matrix-bar magazine having separate chambers for each species of matrix and delivery-channels arranged substantially at right angles to each matrix-chamber, of matrix slides supporting the matrix-bars in the channels and each having a finger to push forward the matrices each finger coöperating with the thin sorts of matrices being thicker than these matrices and having a chamfered face and a front edge which is a little thinner than the pushed forward matrices substantially as described.

3. The combination with a matrix-bar magazine having separate chambers for each species of matrix and delivery-channels arranged substantially at right angles to each matrix-chamber, of matrix slides supporting the matrix-bars in the channels and each having a finger to push forward the matrices each finger coöperating with the thin sorts of matrices being thicker than these matrices and having a chamfered face and a front edge which is a little thinner than the pushed forward matrices and each finger being provided on its back part with a projection of such breadth as to prevent the matrices of the transverse channel to slide through behind the finger substantially as described.

4. The combination with a matrix-bar magazine having separate chambers for each species of matrix and delivery channels arranged substantially at right angles to each matrix-chamber, of matrix slides supporting the matrix-bars in the channels and each having a finger to push forward the matrices each finger having a chamfered face and a front edge which is a little thinner than the pushed forward matrices and being provided on its back part with a projection of such a breadth as to prevent the matrices of the transverse channel to slide through behind the finger and of matrix suspending guide bars one in each of the magazine cross-channels, the front edge of which has a distance of a little more than one, but less than two matrices from the front wall of the magazine canals, substantially as described.

5. The combination with the magazine matrix-slides, the oscillator being engaged by the released delivery-gate, of a series of one-armed levers pivotally mounted in the upper portion of the oscillator and coöperating with the even rear edge of the matrix slides, these levers being formed as eccentrics the radius of which increasing from the upper to the under part of each lever, substantially as described.

6. The combination with the magazine matrix slides, a plunger to push matrix-bars out of the assembly-box, stop-bars or matrix catching bottoms, separate mechanisms for actuating the slides, the plunger and the stop-bars of devices for moving each of these three mechanisms independently of the other substantially as described.

7. The combination with the magazine matrix slides, a plunger to push matrix-bars out of the assembly-box, stop bars or matrix catching bottoms, a mechanism for retracting the stop bars or matrix-catching bottoms, of devices for moving these three mechanisms independently of one another and of an oscillator mechanism provided with three independent bell-crank levers each operatively connected with a separate cam disk substantially as described.

8. The combination with the magazine matrix slides, a plunger to push matrix bars out of the assembly-box, stop-bars or matrix catching bottoms, a mechanism for retracting the stop bars or matrix-catching bottoms of devices for moving these three mechanisms independently of one another, of an oscillator mechanism provided with means for operating each of said three devices independently of the others and of an oscillator spindle operating these means when coupled to a continuously rotating mechanism by a longitudinally adjustable and spring actuated coupling disk, a locking member being released by the action of the magazine matrix slide moving rearward substantially as described.

9. The combination with the matrix-bar magazine having matrix-bar chambers and delivery-channels, matrix-delivery gates, an assembly-box, of a system of stop bars or matrix catching bottoms, each of them being disposed when required either for supporting the released matrix from falling downwards or for detaining it from springing backwards substantially as described.

10. The combination with the matrix-bar magazine having matrix bar chambers and delivery channels, matrix delivery gates, an assembly box of a system of stop bars or matrix catching bottoms, each of them being disposed when required either for supporting the released matrix from falling downwards or for detaining it from springing backwards and means for simultaneously bringing forward two of these stop bars or bottoms into the assembly box, substantially as described.

11. The combination with the matrix-bar magazine having matrix-bar chambers and delivery channels, matrix-delivery gates, an assembly-box, of a system of stop bars or matrix catching bottoms arranged one above the other, each of them being disposed when required either for supporting the released matrix from falling downwards or for detaining it from springing backwards, and means for simultaneously bringing forward two one arranged above the other of these stop-bars or bottoms into the assembly-box, substantially as described.

12. The combination with the matrix-bar magazine having matrix-bar chambers and delivery channels, matrix-delivery gates, an assembly-box, of a system of stop bars or matrix catching bottoms arranged one above the other each of them being disposed when required either for supporting the released matrix from falling downwards or from detaining it from springing backwards, and means for simultaneously bringing forward two one arranged above the other of these stop bars or bottoms into the assembly-box, the upper bottom acting as locking pawl and engaging in a groove on the matrix substantially as described.

13. The combination with the matrix-bar magazine having matrix-bar chambers and delivery channels, matrix-delivery gates, an assembly-box, of a system of stop bars or matrix catching bottoms arranged one above the other each of them being disposed when required either for supporting the released matrix from falling downwards or for detaining it from springing backwards and means for simultaneously bringing forward two one arranged above the other of these stop-bars or bottoms into the assembly-box, the upper bottom acting as locking pawl and engaging in a specially arranged groove on the matrix substantially as described.

14. The combination with the matrix-bar magazine having matrix-bar chambers and delivery channels, matrix-delivery gates, an assembly box, of a system of stop bars or matrix catching bottoms arranged one above the other each of them being disposed when required either for supporting the released matrix from falling downwards or for detaining it from springing backwards and means for simultaneously bringing forward two one arranged above the other of these stop bars or bottoms into the assembly-box, the upper bottom acting as locking pawl and engaging in one of the back side notches of the matrix-bar used as guiding slot for the opposite intaglio character substantially as described.

15. The combination with the matrix-bar magazine, having matrix-bar chambers and delivery channels, matrix-delivery gates, an assembly-box, of a system of stop bars and systems of levers actuated by these stop-bars, intermediate means to coöperate with both, each stop bar being arranged in such a manner as to push forward when struck simultaneously two succeeding levers, the lower serving as a bottom, the upper as a pawl for die falling matrix and engaging in a special or an ordinary groove of this matrix substantially as described.

16. The combination with the matrix-bar magazine having matrix-bar chambers and delivery-channels, matrix-delivery gates, an assembly-box of a system of stop bars, of double-armed levers pivotally attached to the upper side of the stop bars and coöperating with rotatably mounted spring actuated double-armed levers sharpened at the end which serves as bottom and pawl and hooked at the other end and of triangular blocks connected with the under side of the stop bars each having an oblique face coöperating with the rear end of the double armed lever attached to the next below arranged stop-bar, substantially as described.

17. The combination with the matrix-bar magazine having matrix-bar chambers and delivery channels, matrix-delivery gates an assembly-box, of a system of stop bars of vertical projections attached to the upper side of the stop bars, pivotally mounted levers each pivotally bearing a spring actuated bottom lever sharpened at one end, and two of which always coöperate with one of the mentioned stop bar projections, and of spring controlled pins pressing the sharpened end of the bottom levers out from the matrix falling room of the assembler substantially as described.

18. The combination with a matrix-line, a line-abutment or collector-carriage of a spring projected slide guided in grooves of the carriage frame, these grooves arranged so as to allow the released slide to withdraw from the matrix-line in a frictionless manner and means for locking and releasing the slide substantially as described.

19. The combination with a line-abutment or collector carriage of a spring projected slide guided in the carriage, of a perforated or recessed plate sliding in grooves of the carriage frame and locking the slide, means for moving this plate with in the grooves to release the slide springing into the recesses of the plate and menas for moving the plate to lock the slide pushed forward substantially as described.

20. The combination with a line-abutment or collector carriage of a spring projected slide guided in the carriage, of a perforated or recessed plate sliding in grooves of the carriage frame and locking the slide, a stop striking the front edge of the plate when the matrix-line is almost completed, thus releasing the slide and means for removing the collector carriage onto its original position substantially as described.

21. The combination with a line-abutment or collector carriage of a spring projected slide guided in the carriage, of a perforated or recessed plate sliding in grooves of the carriage frame and locking the slide, means for moving this plate within the grooves to release the slide springing into the recesses of the plate and means coöperating with the slide to push it forward while the collector carriage is returning to its original position substantially as described.

22. The combination with a line-abutment or collector carriage of a spring projected slide guided in the carriage, of a perforated or recessed plate sliding in grooves of the carriage frame and locking the slide, a stop striking the front edge of the plate when the matrix-line is almost completed thus releasing the slide, means for removing the collector carriage onto its original position, a spring actuated tappet lever coöperating with the slide pushing it against the locking plate, of a stop striking the upper arm of the tappet lever while the collector carriage is returning to its original position and of pins limiting the stroke of the tappet lever substantially as described.

23. The combination with a line-abutment or collector carriage of a spring projected slide guided in the carriage, of a perforated or recessed plate sliding in grooves of the carriage frame and locking the slide, a stop striking the front edge of the plate when the matrix-line is almost completed, thus releasing the slide, means for removing the collector carriage onto its original position, a spring actuated tappet lever coöperating with a slot provided within the slide pushing it against the locking plate, of a stop striking the upper arm of the tappet lever while the collector carriage is returning to its original position and of pins limiting the stroke of the tappet lever, substantially as described.

24. The combination with a line-abutment or collector carriage of a slide guided in grooves of the carriage frame, a sliding plate locking the slide perforations or recesses within the plate to release the slide, a stop coöperating with the plate, a spring actuated piston to remove the plate the slide being pushed forward, a spring actuated tappet lever coöperating with the slide pushing it against the locking plate and a stop striking the upper arm of the tappet lever while the collector carriage is returning to its original position to push forward the slide onto its locked position, substantially as described.

25. The combination with a line-abutment or collector carriage of an above beveled slide guided in grooves of the carriage frame, a sliding plate releasing and locking the slide, perforations or recesses with beveled edges within the plate to coöperate with the beveled upper edge of the slide, two stops striking the front and the rear edge of the plate thus releasing and locking the slide, a spiral spring coöperating with a slot within the slide to push the slide against the locking plate and of a pin limiting the stroke of the spiral spring substantially as described.

26. The combination with a matrix assembly device, an alining bar for assembling the matrices, a line carriage rail, of a jutting line-carriage body, a matrix transporting bar attached to the line-carriage between its main body and the frame of the machine, a spring actuated swinging wing placed on the right side of the carriage body, a parallel sliding wing, a sleeve connected to the swinging wing and guiding the sliding wing, means for locking and releasing the swinging wing and means for moving the sliding wing parallel with itself substantially as described.

27. The combination with a line-carriage of a swinging wing, a spring actuated double-armed lever locking this wing, a hand actuated lever pushing the wing into contact with the double-armed lever, means for releasing the wing by raising the interior arm of the lever, a sliding wing, a sleeve connected to the swinging wing and guiding the sliding wing and means for moving the sliding wing parallel with itself substantially as described.

28. The combination with a line-carriage, a spring actuated hand locked swinging wing, a sliding wing and a guiding sleeve connected to the swinging wing of a screw sleeve tightened to a shaft moving the sliding wing, of a rack-gear turning this shaft, a bent and indented spring actuated lever provided with a vertical leg and means for moving this leg substantially as described.

29. The combination with a line-carriage, a spring actuated hand locked swinging wing, a sliding wing and a guiding sleeve connected to the swinging wing of a screw sleeve tightened to a shaft moving the sliding wing, of a rack-gear turning this shaft, a bent and indented lever provided with a vertical leg bearing a small pivoted ball, a curved bar attached to the frame of the machine and a spring pressing the pivoted ball towards the curved bar, substantially as described.

30. The combination with a line-carriage, a spring actuated hand locked swinging wing and a sliding wing, of a screw sleeve combined with a slitted ring moving this wing, a shaft, a screw tightening the slitted ring upon the shaft, a spring actuated bent and indented lever, bearing a pivoted ball and a curved bar coöperating with the pivoted ball, substantially as described.

31. The combination with a line-carriage, a spring actuated hand locked swinging wing, means for locking and releasing same, a sliding wing, and means for moving and tightening it, of a bar attached to the carriage serving as a ledge for the released and depressed matrices, substantially as described.

32. The combination with a line carriage transporting the set line of matrices and spacers to the casting anvil, a casting device, a large front plate guiding the front face of the matrices, a withdrawing or depressing device for loosening and leveling the matrices before distributing them consisting of a horizontal upper part and a horizontal bottom portion, a left hand guide ledge arranged on the front side and a right hand guide ledge arranged on the rear side of the large front plate, two vertical slots provided in the front plate, the left one on the front side and the right one on the rear side of same and means for actuating the depressor substantially as described.

33. The combination with a large front plate, of two vertical slots provided in same, the left slot of these being arranged on the front side and the right slot on the rear side of the front plate, a left front and a right rear guide ledge, a horizontal bottom and a horizontal upper part of the depressor, a bridge-shaped projection combined with this upper part and a distance piece connecting the rear guide ledge and the horizontal upper part of the depressor, substantially as described.

34. The combination with a large front plate, of two vertical slots provided in same, the left slot of these being arranged on the front side and the right slot on the rear side of the front plate, a left front and a right rear guide ledge, a horizontal bottom and a horizontal upper part of the depressor, a bridge-shaped projection combined with this upper part, a distance piece connecting the rear guide ledge and the horizontal upper part of the depressor and a vertical slot in the upper edge of the large front plate engaging with the distance piece in its lowest situation substantially as described.

35. The combination with a matrix and spacers-setting device, a matrix line transporting device, a casting device, means for locking the casting device in the state of rest and keeping it locked to prevent an improper cast when the line is improperly justified the space wedges being in their highest position, of means for releasing it, when struck by the space wedges projecting sufficiently far downwards and carrying with the set line to the casting position, the set line being sufficiently justified substantially as described.

36. The combination with a line carriage moving the set lines, a casting device, a one-side pivoted lever for actuating the pump plunger of this casting device, of a tappet lever provided with a shoulder locking the pump lever and attached to a horizontal shaft, a spring actuated lever attached to the shaft of the tappet lever, an angular locking lever attached to a shaft, a lever resting on this shaft and combined with the said spring actuated lever, a spring actuated bell crank lever locking the angular locking lever and provided with a vertical leg reaching into the way of the moving spacers and a pin limiting the upwards torsion of the spring actuated bell crank lever substantially as described.

37. The combination with a casting device, a one-side pivoted lever for actuating the pump plunger of this casting device, of a locking device engaging with this lever, an angular locking lever, a spring actuated bell crank lever to lock and to release the angular locking lever and means to stop the releasing leg of the angular locking lever in the released situation, substantially as described.

38. The combination with a casting device, a one side pivoted lever for actuating the pump plunger of this casting device, of a locking device engaging with this lever, an angular locking lever, a spring actuated bell crank lever the one arm of which coöperates with the inner eccentrical edge of the angular locking lever thus being braked by friction in each situation and a pin limiting the upwards torsion of the spring actuated bell crank lever, substantially as described.

39. The combination with a casting device, a one side pivoted lever for actuating the pump plunger of this casting device, of a locking device engaging with this lever, an angular locking lever, a spring actuated bell crank lever the one arm of which coöperates with the specially formed vertical leg of the angular locking lever in such manner as to be pressed downwards by the turning leg, a pin limiting this torsion of the bell crank lever and a pin limiting the upwards torsion of same, substantially as described.

40. The combination with a line-carriage, a casting device, a one-side pivoted lever for actuating the pump plunger of this casting device, of a locking device engaging with this lever, an angular locking lever, a spring actuated bell crank lever to lock and to release the angular locking lever, means to stop the releasing leg of the angular locking lever in the released situation and a beveled pawl pivotally attached to the line carriage engaging with the horizontal leg of the angular locking lever to lock the pump plunger lever and the locking device again when the line-carriage returns to the setting place substantially as described.

In witness whereof I have hereunder set my hand in presence of two witnesses.

HEINRICH DEGENER.

Witnesses:
  WOLDEMAR HAUPT,
  HENRY HASPER.